United States Patent [19]

Taylor

[11] Patent Number: 4,623,934

[45] Date of Patent: Nov. 18, 1986

[54] AGC UPDATE APPARATUS AND METHOD OF USING SAME

[75] Inventor: Raymond Taylor, Santa Ana, Calif.

[73] Assignee: Rockwell International Corporation, El Segundo, Calif.

[21] Appl. No.: 552,512

[22] Filed: Nov. 16, 1983

[51] Int. Cl.[4] .............................................. H04N 1/40
[52] U.S. Cl. .................................. 358/280; 358/174; 358/257; 358/286; 375/8; 375/98
[58] Field of Search ............... 358/174, 286, 256, 257, 358/280; 375/8, 98

[56] References Cited

U.S. PATENT DOCUMENTS

| | | | |
|---|---|---|---|
| 3,619,493 | 11/1971 | Krallinger et al. | 358/286 |
| 4,355,402 | 10/1982 | Kromer et al. | 375/98 |
| 4,453,258 | 6/1984 | Richardson | 375/98 |
| 4,499,586 | 2/1985 | Cafarella et al. | 375/98 |
| 4,539,692 | 9/1985 | Mijmter | 375/98 |

FOREIGN PATENT DOCUMENTS 2034139 5/1980 United Kingdom ................. 375/98

*Primary Examiner*—James J. Groody
*Assistant Examiner*—Edward L. Coles
*Attorney, Agent, or Firm*—H. Fredrick Hamann; David J. Arthur

[57] ABSTRACT

A modem having automatic gain control update circuitry for use with CCITT Group II facsimile machines. The update circuitry receives incoming facsimile data samples, averages the samples for predetermined periods, compares the averages to find the maximum during each line of facsimile data, and updates a gain control to accommodate the maximum found. The update circuitry allows the modem automatic gain control to operate without the use of external synchronization strobe signals, and has an optional selectable fast automatic gain control adjustment mode.

33 Claims, 4 Drawing Figures

AGC UPDATE APPARATUS AND METHOD OF USING SAME

FIELD OF THE INVENTION

This invention relates to electronic communications circuitry and pertains particularly to automatic gain control circuitry for modems used with facsimile machines.

CROSS REFERENCE TO A RELATED APPLICATION

A programmable digital processor which may be used to implement this invention is described in U.S. patent application Ser. No. 538468, filed Oct. 3, 1983, titled "Signal Processor Device"0, listing Glen R. Griffith, Donald D. Harenberg, and George A. Watson as inventors, the disclosure of which is incorporated herein by reference.

BACKGROUND OF THE INVENTION

Facsimile machines are made which include modems having automatic gain control (AGC) circuitry. Such facsimile machInes are used for the transmission of drawings or writings from point-to-point using a communications system, such as a telephone network. The transmitting facsimile machine operates mechanisms for scanning parallel lines across the drawing or writing in order to detect markings, and by sending electrical data signals during each line of the scanning, with the data signals corresponding to the intensity of the markings. The receiving facsimile machine operates mechanisms for scanning parallel lines across a blank sheet of paper for printing markings corresponding to the electrical data signals received from the transmitter facsimile machine, thus reproducing the markings detected by the transmitting facsimile machine. One particular protocol for the data signals, known as CCITT Group II format, calls for the production of signals having high energy, "white" portion for the initial portion of eacn scanning line, and calls for data signals having a magnitude which increases with increases in the intensity of markings.

A particular problem faced by Group II modem receivers is that the time averaged energy of incoming received data signals is not constant, but varies with the intensity of the markings being scanned. That is, the energy output of a Group II transmitter is a function of the base-band modulating input, with black and white markings causing minimum and maximum transmitted energy, respectively, with shades of grey falling somewhere between these extremes. Facsimile machine protocols other than Group II may include scrambling algorithms in which uniform average energy communications are produced. Conventional AGC loop circuitry senses the incoming data signal energy and adjusts a gain control accordingly in order to produce the level of amplification necessary. The use of such conventional AGC circuitry with Group II protocol is not possible because the transmitted energy is not uniform but varies with the intensity of the markings being scanned.

An AGC technique which has been used with prior Group II facsimile modems requires the use of circuitry to synchronize the modem with the start of each line, and to use a strobe pulse generated at the start of each line to enable the AGC gain control so that AGC adjustments are made only during the initial portions of lines, when the incoming data signal has maximum energy. The strobe pulse is typically generated by the facsimile mechanism controlling circuitry and is provided to the modem circuitry. Such a strobe technique is inconvenient, particularly when a standardized modem AGC circuit is to be constructed for use by a large number of different facsimile machine manufacturers having differing facsimile machine constructions which have differing strobe pulse characteristics.

The Group II facsimile protocol transmissions proceed, in sequence, by sending a framing header, waiting for acknowledgment signals from the receiving facsimile machine, sending the page of the drawing or writing, ceasing transmissions, and resuming the transmission sequence with a new framing header and repeating the sequence until all pages have been sent. The framing header consists of thirty-six lines sent serially, with each line consisting of an initial "black" (low energy) portion having a duration equal to 4% to 6% of a line duration followed by the remainder of the line which is totally "white" (high energy). The purpose of the framing header is to allow the mechanisms of the receiving facsimile machine printer to become synchronized with the mechanisms of the transmitting facsimile machine scanner. Conventional Group II modem AGC circuits, as described above, rely on the facsimile machine synchronization to control the strobing of AGC update adjustments.

After the framing header has been received, the receiving facsimile machine answers back with signals acknowledging receipt of the framing header and indicating readiness to receive the page data. The page data consists of a large number of lines sent serially, with each line consisting of an initial "white" (high energy) portion having a duration equal to 4% to 6% of a line duration followed by the remainder of the line which has an energy level which varies with the intensity ("black" to "white") of the markings being scanned.

The Group II protocol uses a vestigial sideband, suppressed carrier form of amplitude modulation in which predominantly "white" markings are associated with large signal amplitudes and predominantly "black" markings are associated with small signal amplitudes. The Group II protocol provides that facsimile data is to be communicated digitally, as binary ones and zeros, in a serial bit stream. When a Group II binary one is transmitted, the instantaneous amplitude and energy transmitted becomes very large. Therefore, when a "white" marking is scanned, mostly binary ones are transmitted and tne amplitude and energy transmitted remains large during "white" transmissions. When a Group II binary zero is transmitted, the instantaneous amplitude and energy transmitted becomes very small. Therefore, when a "black" marking is scanned, mostly binary zeros are transmitted and the amplitude and energy transmitted remains small during "black" transmissions.

SUMMARY OF THE INVENTION

It is therefore an object of this invention to provide automatic gain control for a Group II facsimile machine modem.

A further object of the invention is to provide automatic gain control in a modem without requiring an external synchronization strobe signal input.

Another object of the invention is to provide an automatic gain control update method which is selectively responsive to the "white" initial portion of facsimile page line data transmissions.

An object of the invention is to provide a modem automatic gain control having a fast AGC mode allowing quick changes to be made in gain control amplification during the start of facsimile framing header data reception.

A further object of the invention is to provide an automatic gain control for a modem in which updating of a gain control is performed by a programmed electronic digital computer processor.

The automatic gain control update apparatus of this invention uses a programmed digital processor to receive samples of the incoming Group II facsimile data, to average the data for periods having a duration of approximately 2 percent of a facsimile line, to compare the period averages to find the maximum for each line, and to update the gain control to the amplification level appropriate for the maximum of the period averages.

Therefore, the AGC update apparatus of this invention automatically detects the initial "white" portion of each facsimile page line, and ignores the remainder of the line, when setting the gain control. This is an important detecting feature of the invention since the remainder of the line, after the initial "white" portion, does not have a constant amplitude or energy average but varies with the intensity of the markings under scan. The averaging and comparing functions are performed by loops of program instructions which perform the appropriate logical functions. The programmed processor is connected to receive signals from and control the gain of an analog gain control stage in the modem which amplifies received facsimile signals. The processor responds to a mode selection signal from the facsimile machine circuitry in order to select between fast and slow AGC update frequency modes, thus allowing the facsimile modem to rapidly accomodate itself to incoming framing header data signals.

DESCRIPTION OF THE PREFERRED EMBODIMENT

Figure 1:
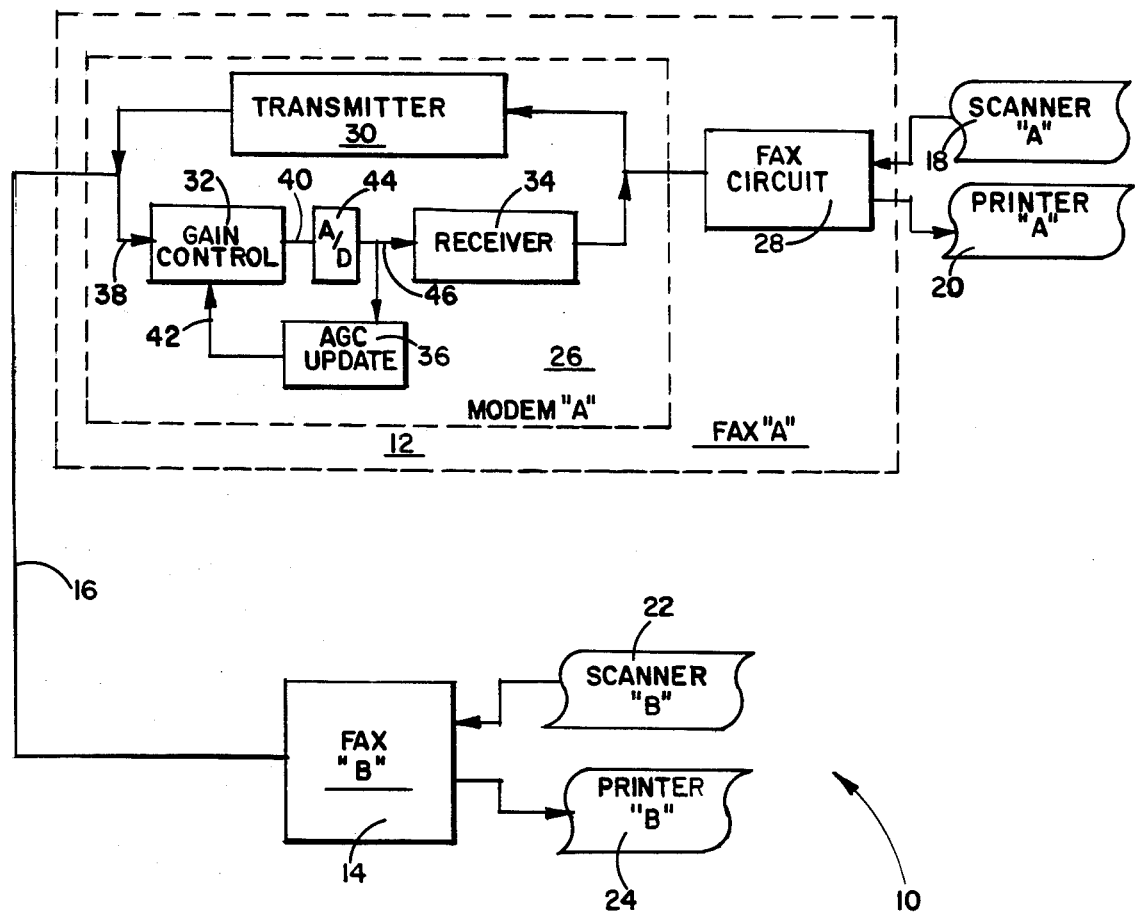
FIG. 1 is a block diagram of the electronic circuitry of a pair of facsimile machines using the AGC update apparatus of this invention.

Referring first to FIG. 1, the facsimile communication system 10 includes a first facsimile machine 12 (FAX A), and a second facsimile machine 14 (FAX B) which are interconnected by a communications cable 16. The signals exchanged on the cable 16 by the facsimile machines 12 and 14 are signals complying with the CCITT Group II protocol. The cable 16 may be a two conductor electrical signal path provided by a telephone company through a series of exchanges, switches, satellite relays, etc. in order to provide long distance point-to-point communications.

The facsimile machine 12 is connected to control a scanner 18 (SCANNER A) and a printer 20 (PRINTER A) which are mechanisms for detecting markings, and for printing markings, respectively. The scanner 18 and printer 20 may be considered as integral parts of the facsimile machine 12. Similarly, the facsimile machine 14 is connected to control a scanner 22 (SCANNER B), and a printer 24 (PRINTER B). For the purposes of this description, the case under consideration will be that occuring when markings on a drawing or writing are detected by the scanner 22, transmitted by the facsimile machine 14 onto the cable 16, received by the facsimile machine 12, and corresponding markings are reproduced by the printer 20. Note that facsimile transmissions in the reverse direction; i.e., sent from the scanner 18 to the printer 24, are also possible.

The facsimile machine 12 includes a modem 26 (MODEM A) and a facsimile circuit 28. The function of the modem 26 is to transmit signals onto, and receive signals from the cable 16. The function of the facsimile circuit 28 is to control the operations of the scanner 18 and printer 20. The facsimile machine 14 is similar in construction to the facsimile machine 12.

The modem 26 has a transmitter 30, a gain control 32, a receiver 34, an analog to digital converter 44, and an AGC update controller 36. It is preferred that the modem 26 be constructed with an analog variable gain amplifier for the gain control 32 and a programmed electronic digital computer processor for performing the functions of the transmitter 30, receiver 34, and AGC update controller 36. It is also appropriate to include analog signal conditioning and interfacing circuitry for the transmitter 30 and receiver 34.

The gain control 32 is preferably a variable gain analog amplifier having a signal input 38, a signal output 40, and a gain control input 42. The function of the gain control 32 is to amplify voltage signals received on the input 38 (which is coupled to the cable 16) and produce an amplified signal output on the output 40. The amplification or gain factor for the gain control 32 is specified by the gain control input 42 which is in the form of a multi-bit digital binary gain setting word. It is preferable that the gain control 32 adjust its amplification in response to the logarithm of the gain control setting received through the input 42.

The modem 26 includes an analog-to-digital converter 44 having its input connected to the gain control output 40 and producing an output 9-bit digital conversion word on the line 46. The function of the A/D converter 44 is to measure the amplitude of the voltage signals on the line 40 and produce 9-bit digital samples on the output 46, with the samples corresponding to the amplitude measured on the line 40 and with the samples preferably being produced at a rate of 10,368 samples per second.

The AGC update controller 36 responds to the magnitude of the samples produced on the line 46 by producing appropriate output signals on line 42 in order to control the amplification provided by the gain control 32. The receiver 34 has an input connected to the line 46 and an output coupled to the facsimile circuit 28. The function of the receiver 34 is to perform the various standard receiver operations necessary for the modem 26, including carrier detection, timing jam, equalization, etc.

It is preferable that the transmitter 30, receiver 34, and AGC update controller 36 be constructed using a programmed digital processor of the type described in U.S. patent application Ser. No. 538,468, filed Oct. 3, 1983, titled "Signal Processor Device", listing Glen R. Griffith, Donald D. Harenberg, and George A. Watson as inventors, the disclosure of which is incorporated herein by reference.

Figure 2:
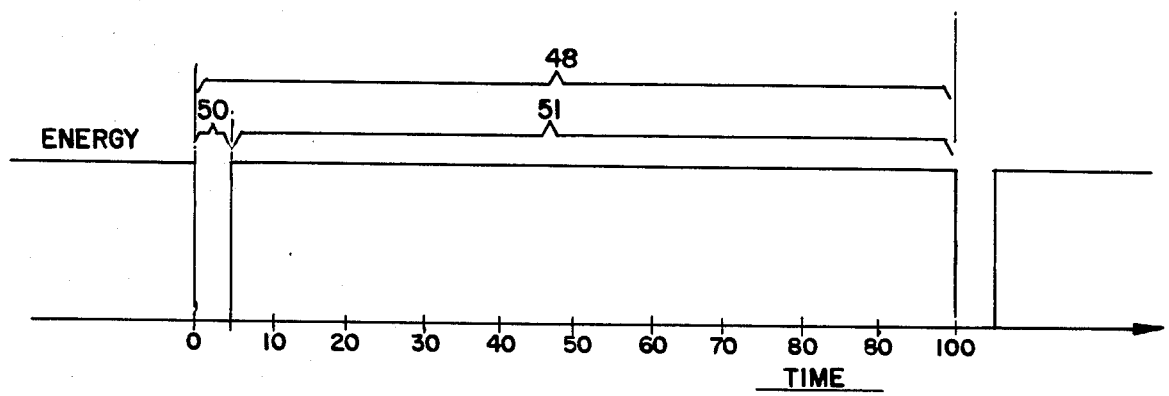
FIG. 2 is an energy versus time plot for the signals produced by a facsimile machine using the CCITT Group II protocol during the transmission of a framing header.

Referring next to FIG. 2, an energy versus time plot for the CCITT Group II protocol during the framing header transmission is shown, with the vertical energy scale being shown in arbitrary units from a baseline of zero, and with the horizontal time scale being shown in units of percentage of a facsimile line duration. The time duration of a facsimile line is indicated by the line 48. Note that the initial "black", low energy portion 50 of the line 48 is followed by a "white", high energy remainder 51. The low energy portion 50 occupies approximately the initial four to six percent of the duration of the line 48.

Figure 3:
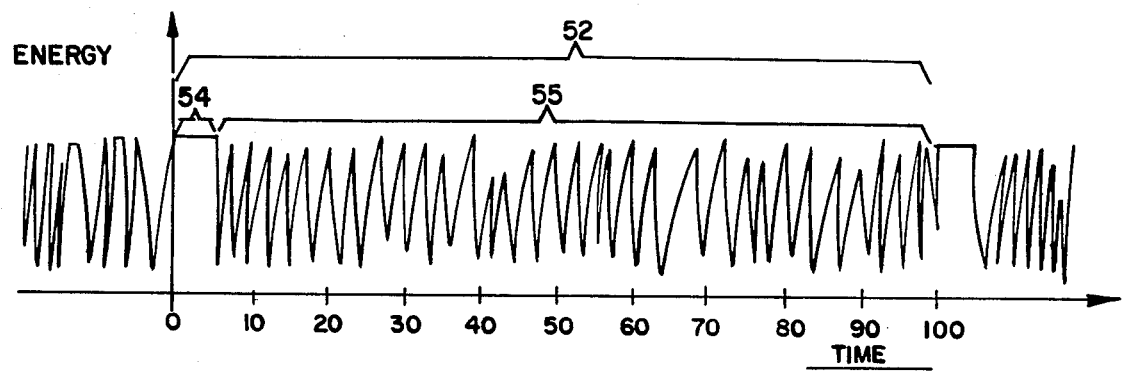
FIG. 3 is an energy versus time plot for a facsimile machine using CCITT Group II protocol during the transmission of signals representing the markings on a page of a drawing or writing.

Referring next to FIG. 3, the energy versus time plot for the CCITT Group II protocol during page data transmission has a vertical energy axis which is scaled arbitrarily from a zero baseline, and has a horizontal time axis which is scaled in terms of percentage of a facsimile line duration. The line duration of a Group II facsimile line is approximately 0.167 seconds, with lines being transmitted at a rate of approximately 6 lines per second. The line 52 shown in FIG. 3 is a Group II facsimile protocol line transmitted during the transmission of a page of a drawing or writing, and has an initial "white", high energy portion 54 for the first four to six percent of the duration of the line 52, followed by a remainder portion 55 in which the average energy transmitted varies in accordance with the intensity of the markings under scan.

Figure 4:
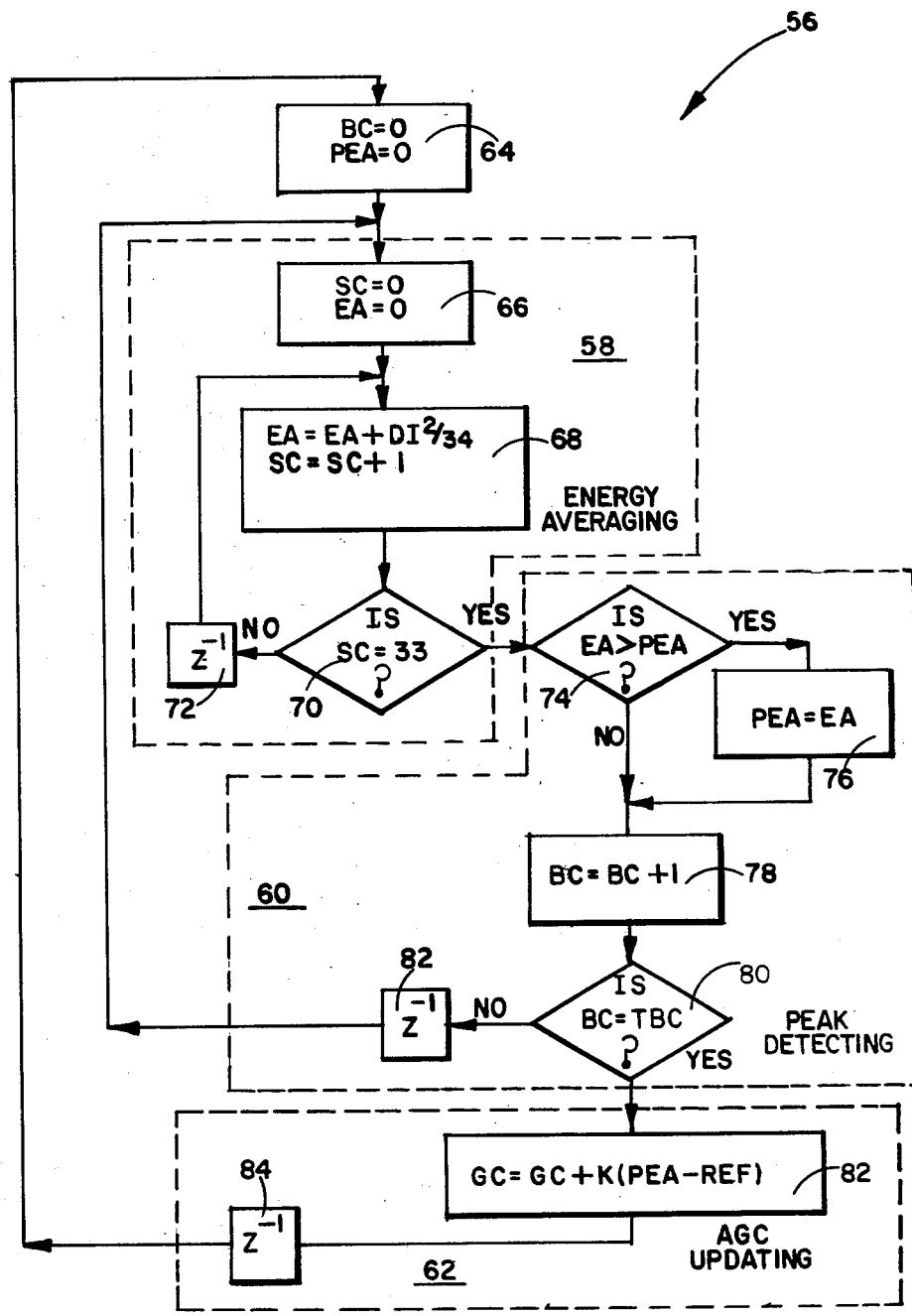
FIG. 4 is a computer program flow chart detailing operation of the AGC update apparatus of this invention.

Referring next to FIG. 4, a computer program 56 flow chart for use in a computer processor to provide the functions of the AGC update controller 36 shown in FIG. 1 is presented. The following symbols are used to indicate variables in the flow chart:

| SYMBOL | DEFINITION |
|---|---|
| REF | Reference Energy Average |
| SC | Sample Count |
| BC | Block Count |
| EA | Energy Average |
| PEA | Peak Energy Average |
| DI | Data In |
| GC | Gain Control |
| K | Loop Constant (Sensitivity Adjustment) |
| TBC | Block Count Target, TBC = 51 for Slow AGC Mode, TBC = 5 for fast AGC Mode |

The program of FIG. 4 is designed to operate in a continuous cycle during Group II modem reception operations, including the receiving of framing header data signals (see FIG. 2), and the receiving of page marking data signals (see FIG. 3). The data input sample, represented by the symbol DI, is received by the program 56 as a result of the nine-bit digital word produced on the line 46 by the A/D converter 44 (see FIG. 1). The symbol TBC is set to adjust the update frequency for the AGC update controller 36 in accordance with mode selection control signals received from the facsimile circuit 28 (see FIG. 1).

The program 56 includes an energy averaging routine 58, a peak detecting routine 60, and an AGC updating routine 62. The function of the energy averaging routine 58 is to compute the average received energy on the cable 16 during time intervals having durations equal to approximately two percent of a facsimile line duration. The function of the peak detecting routine 60 is to compare the energy averages computed by the routine 58 and to find the maximum energy average occurring during a peak detection time period, with the duration of the peak detection time period being set in accordance with the desired AGC update frequency to allow for both fast and slow AGC update modes.

An AGC updating routine 62 is provided in the program 56 in order to produce a gain control output GC for provision to the input 42 of gain control 32 (see FIG. 1), in accordance with the maximum energy average found by the routine 60.

The program 56 proceeds by executing an initialization step 64 in which the variable symbols BC and PEA are both set equal to zero. Next, the energy averaging routine 58 is performed including the steps 66, 68, 70 and 72. The step 66 follows the step 64 and initializes the variable symbols SC and EA to zero. The computation step 68 follows the step 66 and sets the variable symbol EA equal to the previous value of the symbol EA added to the data input (DI) squared and divided by 34. The number 34 is chosen in the step 68 in order to provide an energy average (EA) for two percent of a facsimile line duration, and is set in accordance with the rate at which the A/D converter 44 produces the data input samples (DI).

The step 68 also increments the value of the symbol SC by one. The decision step 70 follows the step 68 and provides an end test for an instruction loop including the steps 68, 70, and delay step 72. The test step 70 determines whether the variable symbol SC has been incremented to the number 33, and causes execution of the steps 72 and 68 if the test has not been met. If the test of step 70 has been met, then step 74 of routine 60 is next executed. The number 33 is used as a test condition in the step 70 in order to insure that energy averages are performed over approximately two percent of a facsimile line duration.

The peak detecting routine 60 includes the steps 74, 76, 78, 80 and 82. The comparison step 74 compares the energy average EA (as just computed by the routine 58) with the value of the peak energy average PEA. If the energy average EA exceeds the peak energy average PEA, then step 76 is executed to set the peak energy average PEA equal to a new value, the just computed value of the energy average EA, and then step 78 is executed to increment the value of the block count symbol BC. If the test of step 74 is not met, then the step 78 is executed without executing the step 76. The decision step 80 follows the step 78 and compares the value of the block count symbol BC with the value of a target block count TBC. The value of the symbol TBC is set in order to control the update frequency for the AGC update controller 36. The symbol TBC is set equal to 51 for a slow AGC update mode, and is set equal to 5 for a fast AGC update mode. The value of the symbol TBC is determined by the facsimile circuit 28 and is generally set equal to 5 during framing header data signal transmissions (see FIG. 2), and is generally set equal to 51 for page data signal transmissions (see FIG. 3). If the step 80 determines that the block count BC has not been incremented to reach the target block count TBC, then the delay step 82 is executed and a loop is made to continue execution with the step 66. If the test of step 80 is met, then step 82 of routine 62 is next executed.

The AGC updating routine 62 includes steps 82 and 84. The computation step 82 sets the value of the gain control symbol GC equal to the previous value of GC added to a constant factor K multiplied by the difference between the values of the symbols PEA and REF. The function of the step 82 is to compute a multi-bit digital word, corresponding to the symbol GC, for providing to the input 42 of the gain control 32 (see FIG. 1). In the computation step 82, the symbol REF represents the desired value for the peak energy average, the symbol PEA represents the measured value for the peak energy average, and the factor K represents a factor set to achieve the desired slewing rate for the AGC update controller 36. After the step 82 is executed, the delay step 84 is executed, and a loop is made so that the program 56 continues with execution of the step 64. By looping back to the step 64, the steps of the program 56 are caused to be cyclically repeated in order to repetitively update the gain control 32 during reception of the incoming data signal on the input 38.

The delay steps 72, 82 and 84 are similar in function and allow the execution of the program 56 to be delayed during the time that each data input DI value is being prepared by the A/D converter 44. During the delay times produced by the steps 72, 82, and 84, the digital computer processor used in the modem 26 executes programs relating to the operations performed by the transmitter 30 and receiver 34.

OPERATION OF THE PREFERRED EMBODIMENT

The AGC update controller 36 repetitively computes energy averages for Group II facsimile data, with the energy averages being taken for time periods equal to one-half or less of the duration of the initial portion (portion 54 of FIG. 3) of a facsimile line. Since the initial portion of a facsimile line is approximately four to six percent of a facsimile line duration, it is preferable that the energy averaging performed by the routine 58 (see FIG. 4) is performed for a time period having a duration equal to approximately two percent of a facsimile line duration; that is, the energy averaging of the routine 58 is performed over periods of approximately 0.00333 seconds. The energy averaging periods of the routine 58 are chosen to be one-half or less of the minimum expected initial portion 54 duration in order to insure that at least one energy averaging period includes only "white", high energy signals produced during the initial portion 54 (see FIG. 3).

The value for the symbol TBC in the step 80 of routine 60 (see FIG. 4) is chosen to be equal to 5 (for a fast AGC mode) during facsimile framing header data reception (see FIG. 2) in order to insure that the gain control 32 amplification is rapidly adjusted during initial receipt of signal, but also so that false adjustments during the initial "black" portion 50 are avoided; that is, for the fast AGC mode, it is desirable that the value of TBC be set small (for rapid adjustments) but not so small as to search for a peak energy average PEA during a time period which is less than or equal to the maximum duration of the initial portion 50. Actually, since the energy averages EA are determined for periods of 2% of a line, the fast AGC mode value of TBC is set to 5 to produce a time period which is longer than the maximum duration of the initial portion 50 plus 2% of a line duration. Setting TBC equal to 5 insures that an energy average EA consisting of entirely "white" high energy samples will occur during a search by the routine 60 for a peak energy average PEA during a time period containing the initial "black" low energy portion 50.

The value for the symbol TBC in the step 80 of routine 60 (see FIG. 4) is chosen to be equal to 51 (for a slow AGC mode) during facsimile page data reception (see FIG. 3) in order to insure that at least one complete initial portion 54 occurs during any search for the peak energy average PEA by the routine 60; that is, the value of the variable TBC must be set so that the routine 60 searches for a peak energy average PEA during a time period which is greater than or equal to the maximum time duration of a facsimile line. Therefore, since each Group II facsimile line is expected to having a duration of approximately 0.167 seconds, it is preferable that the variable TBC be set to the value 51 in order to provide a period for the routine 60 equal to approximately 0.170 seconds.

For the particular embodiment of the program 56 used in this invention, the value of the symbol K is set to 0.0156 and the value of the symbol REF is set to 0.25. The value of the symbol REF is set to be large enough so that the receiver 34 receives an adequate signal level from the A/D converter 44 output 46 during reception of facsimile page data signals (see FIG. 3). The value of the symbol K is set high enough so that expected variations in the signal level at the input 36 can be compensated for by update controller 36 producing changes in amplification by the gain control 22 between sequential received lines of facsimile page data signals; however, the value of the symbol K is not set so high that temporary changes in signal level due to noise, etc., cause the gain control 32 amplification level to be radically changed and produce unstable operation.

It is understood that various alternatives may be used for the constructions described herein without departing from the spirit of the invention and the scope of the appended claims. For example, the technique shown herein may be used with discrete analog or digital circuitry rather than using the programmed digital computer processor described. Also, the techniques may be used for circuitry other than that devoted to CCITT Group II facsimile data reception.

What is claimed is:

1. A modem automatic gain control method for a modem having a modem gain control, the gain control having an input for receiving an incoming signal, an output for an amplified output signal, and a control input for receiving an amplification setting, with the amplitude gain of said gain control being responsive to said amplification setting, said method comprising the steps of:

amplifying said incoming signal in said gain control to produce said amplified output signal, with the amount of amplification of said gain control being set by said control input;

measuring the magnitude of said output signal during a plurality of sampling time periods to form a plurality of digital magnitude samples;

digitally comparing said magnitude samples occuring during a comparison time period to find a peak magnitude; and adjusting said control input in accordance with said peak magnitude.

2. The method of claim 1 wherein said incoming signal is a facsimile Group II signal having a sequence of facsimile lines, with each line having a predetermined line time duration, and each line having an initial portion with a predetermined initial portion time duration, wherein:

said sampling time periods each have a sampling time period duration less than one-half of said initial portion time duration.

3. The method of claim 2 wherein said sampling time periods each have a sampling time period duration equal to approximately 2 percent of said line time duration.

4. The method of claim 2 wherein said comparison time period has a comparison time period duration which is at least as long as said line time duration.

5. The method of claim 4 wherein said comparison time period has a comparison time period duration equal to the duration of approximately 51 of said sampling time periods.

6. A modem automatic gain control method for a modem having a modem gain control, the gain control having an input for receiving an incoming signal, an output for an amplified output signal, and a control input for receiving an amplification setting, with the amplitude gain of said gain control being responsive to aid amplification setting, said method comprising the steps of:

amplifying said incoming signal in said gain control to produce said amplified output signal, with the amount of amplification of said gain control being set by said control input;

measuring the magnitude of said output signal during a plurality of sampling time periods to form a plurality of digital magnitude samples;

digitally comparing said magnitude samples occurring during a comparison time period to find a peak magnitude; and adjusting said control input in accordance with said peak magnitude;

wherein said incoming signal is a facsimile Group II signal having a sequence of facsimile lines, with each line having a predetermined line time duration, and each line having an initial portion with a predetermined initial portion time duration, wherein said sampling time periods each have a sampling time period duration less than one-half of said initial portion time duration; and wherein said comparison time period has a comparison time period duration which is selectable between a fast duration and a slow duration and wherein:

said fast duration is at least as long as said initial portion time duration and shorter than said line time duration; and said slow duration is at least as long as said line time duration.

7. The method of claim 6 wherein:
said fast duration is equal to the duration of approximately 5 of said sampling time periods; and
said slow duration is equal to the duration of approximately 51 of said sampling time periods.

8. The method of claim 1 further comprising the step of selecting the duration of said comparison time period.

9. The method of claim 1 wherein said magnitude samples are responsive to the energy of said output signal.

10. The method of claim 9 wherein said step of measuring comprises the steps of:
computing data signal energy samples responsive to said output signal; and averaging the data signal energy samples during said plurality of sampling time periods to form said plurality of magnitude samples. PF 83057

11. The method of claim 10 wherein said step of computing comprises squaring the instantaneous amplitude of said output signal to produce said data signal energy samples.

12. The method of claim 1 wherein said step of adjusting comprises:
determining the magnitude difference between said peak magnitude and a predetermined reference magnitude; and
incrementing said amplification setting by an amount proportional to said magnitude difference.

13. The method of claim 1 wherein said steps of measuring, comparing, and adjusting are performed by a programmed digital computer.

14. The method of claim 1 wherein said steps are cyclically repeated in order to repetitively adjust said gain control during reception of said incoming signal.

15. An automatic gain control method for updating a gain control in a Group II facsimile reception system modem in which maximum energy is received for four to six percent of the time duration of each facsimile line during facsimile page reception, said method comprising the steps of:
computing data signal energy samples responsive to said amplified output signal;
averaging the data signal energy samples for periods equal to approximately two percent of a line time duration to form a plurality of signal energy averages;
comparing the signal energy averages to find the maximum signal energy average occurring in a set of approximately 51 such averages; and
updating the amplification of said gain control in accordance with said maximum signal energy average.

16. The method of claim 15 wherein said steps are cyclically repeated in order to repetitively update said gain control during reception of said incoming data signals.

17. The method of claim 15 having a fast AGC mode wherein said step of comparing finds the maximum signal energy average occurring in a set of approximately five such averages.

18. The method of claim 15 wherein said data signal energy samples are formed in said step of computing by squaring the instantaneous amplitude of said amplified output signal.

19. The method of claim 15 wherein said steps of computing, averaging, comparing, and updating are performed by a programmed digital computer.

20. The method of claim 15 wherein said step of updating comprises incrementing the amplification of said gain control by an amount corresponding to a sensitivity factor multiplied by the difference between said maximum signal energy average and a reference value.

21. A modem for use in a facsimile communications system wherein data is communicated serially as lines with each line comprising a serial stream of data bits, and with each line having an initial maximum energy portion, said initial portion having a predetermined minimum initial portion time duration and each said line having a predetermined maximum line time duration, said modem having a gain control and further comprising:

means for sampling said incoming data bit stream to form a plurality of data signal samples;

means for computing data signal energy samples corresponding to the energy of said data signal samples;

means for averaging said data signal energy samples for periods having a duration less than one-half said predetermined minimum initial portion time duration, in order to form a plurality of signal energy averages;

means for comparing the signal energy averages to find the maximum signal energy average occurring during a period greater than said predetermined maximum line time duration; and means for updating said gain control in accordance with said maximum signal energy average.

22. A modem having an adjustable gain control with an input for receiving an incoming data signal and an output for a gain control data output signal, said modem further comprising:

means for determining periodic data indices based on application of a predefined index computation rule to said gain control data output signal;

means for comparing indices occuring during a predefined comparison time period duration to form a comparison result; and means for adjusting said gain control in accordance with said comparison result.

23. The modem of claim 22 wherein said means for determining comprises:

means for computing periodic data signal energy samples from said gain control data output signal; and means for averaging said energy samples for time intervals to form said periodic data indices.

24. The modem of claim 23 wherein said energy samples are computed periodically by squaring the instantaneous amplitude of said gain control data output signal.

25. The modem of claim 22 wherein said predefined index computation rule specifies that said data indices are equal to the periodic averages of the squares of the instantaneous amplitude of said gain control data output signal.

26. The modem of claim 22 wherein said comparison results are the maximum of said indices occuring in said predefined comparison time period duration.

27. The modem of claim 22 wherein said means for adjusting alters the amplification of said gain control in an amount responsive to the difference between said comparison result and a reference value.

28. The modem of claim 22 wherein said predefined time period duration is greater than the maximum duration of a line of a Group II facsimile data signal transmission.

29. A modem having an adjustable gain control with an input for receiving an incoming data signal and an output for a gain control data output signal, said modem further comprising:

means for determining periodic data indices based on application of a predefined index computation rule to said gain control data output signal;

means for comparing indices occurring during a predefined comparison time period duration to form a comparison result; and means for adjusting said gain control in accordance with said comparison result;

wherein said modem has a fast AGC mode and slow AGC mode, and means for selecting between said modes; with said first AGC mode having said comparison time period duration set to a fast mode duration, and with said slow AGC mode having said comparison time period duration set to a slow mode duration longer than said fast mode duration.

30. A modem automatic gain control method for a modem having a modem gain control, the gain control having an input for receiving an input signal including a periodic portion having a high energy level, an output for an amplified output signal, and a control input for receiving an amplification setting, with the amplitude gain of said gain control being responsive to said amplification setting, the method comprising the steps of:

amplifying said incoming signal in said gain control to produce said amplified output signal, with the amount of amplification of said gain control being set by said control input;

measuring the magnitude of said output signal during a plurality of sampling time periods, each of which is shorter than the duration of said periodic portion of high energy in said input signal, to form a plurality of digital magnitude samples;

digitally comparing said magnitude samples occurring during a comparison time period to find a peak magnitude; and adjusting said control input in accordance with said peak magnitude.

31. A facsimile modem automatic gain control method for a facsimile modem having a modem gain control, said gain control having an input for receiving an incoming signal comprising a sequence of facsimile lines, wherein each line has a predetermined line time duration, and each facsimile line has an initial portion having a predetermined initial portion time duration during which said signal has a high level of energy, said gain control further including an output for an amplified output signal, and a control input for receiving an amplification setting, with the amplitude gain of said gain control being responsive to said amplification setting, said gain control method comprising the steps of:

amplifying said incoming signal in said gain control to produce said amplified output signal;

measuring the magnitude of said output signal during a plurality of sampling time periods to form a plurality of digital magnitude samples, wherein each of said sampling time periods is not longer than said initial portion time duration;

digitally comparing said magnitude samples occurring during a comparison time period to find a peak magnitude; and adjusting said control input in accordance with said peak magnitude.

32. The facsimile modem automatic gain control method of claim 31, wherein said sampling time periods each have a sampling time period duration less than about ½ of said initial portion time duration.

33. The facsimile modem automatic gain control method of claim 32, wherein said comparison time period has a comparison time period duration at least as long as said line time duration.

* * * * *